United States Patent
Ripley et al.

(10) Patent No.: US 12,497,011 B2
(45) Date of Patent: Dec. 16, 2025

(54) TRAILER SPRING BRAKE VALVE AND METHOD OF OPERATING THE SAME TO DETERMINE TYPE OF BRAKE PRIORITY

(71) Applicant: Bendix Commercial Vehicle Systems LLC, Avon, OH (US)

(72) Inventors: John V Ripley, Elyria, OH (US); Joseph M Macnamara, Ashland, OH (US); Randy J Salvatora, Columbia Station, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 638 days.

(21) Appl. No.: 17/822,308

(22) Filed: Aug. 25, 2022

(65) Prior Publication Data

US 2024/0067148 A1    Feb. 29, 2024

(51) Int. Cl.

| B60T 13/58 | (2006.01) |
|---|---|
| B60T 8/18 | (2006.01) |
| B60T 13/38 | (2006.01) |
| B60T 13/66 | (2006.01) |
| B60T 13/68 | (2006.01) |
| B60T 17/22 | (2006.01) |

(52) U.S. Cl.
CPC .......... B60T 13/588 (2013.01); B60T 8/1887 (2013.01); B60T 13/385 (2013.01); B60T 13/662 (2013.01); B60T 13/683 (2013.01); B60T 17/22 (2013.01); B60T 2250/02 (2013.01); B60T 2270/88 (2013.01)

(58) Field of Classification Search
CPC .... B60T 13/588; B60T 8/1887; B60T 13/385; B60T 13/662; B60T 13/683; B60T 17/22; B60T 2250/02; B60T 7/20; B60T 2270/88
See application file for complete search history.

(56) References Cited

U.S. PATENT DOCUMENTS

| 5,445,440 | A | * | 8/1995 | Plantan | ................. | B60T 13/265 |
|---|---|---|---|---|---|---|
|  |  |  |  |  |  | 303/7 |
| 5,511,860 | A | * | 4/1996 | Wallestad | ............. | B60T 13/265 |
|  |  |  |  |  |  | 303/41 |
| 6,012,781 | A | * | 1/2000 | Gerum | ...................... | B60T 7/20 |
|  |  |  |  |  |  | 303/22.4 |
| 8,249,789 | B2 |  | 8/2012 | Ramler |  |  |
| 9,783,019 | B2 |  | 10/2017 | Diekmeyer |  |  |
| 2020/0094805 | A1 | * | 3/2020 | Riley | .................... | B60T 8/1708 |

OTHER PUBLICATIONS

Japanese Patent No. JP 3665331 published on Jun. 29, 2005.*
WO document No. WO 2023/056257 to Shelton, III published on Apr. 6, 2023.*
Bendix Commercial Vehicle Systems LLC, "Bendix PR-2, PR-3 & PR-4 Pressure Protection Valves," SD-03-2010 Service Data Sheet, Oct. 2018, 4 pages, Bendix Commercial Vehicle Systems LLC, Avon Ohio U.S.A.

\* cited by examiner

*Primary Examiner* — Pamela Rodriguez
(74) *Attorney, Agent, or Firm* — Cheryl L. Greenly; Brian E. Kondas; Geoffrey A. Kudlo

(57) ABSTRACT

A trailer spring brake valve is provided for a vehicle air braking system. The trailer spring brake valve comprises a number of components arranged to cooperate together to provide type of brake priority based upon trailer weight.

19 Claims, 17 Drawing Sheets

TRAILER SPRING BRAKE VALVE AND METHOD OF OPERATING THE SAME TO DETERMINE TYPE OF BRAKE PRIORITY

BACKGROUND

The present application relates to vehicle air braking systems capable of spring brake priority or service brake priority, and is particularly directed to a trailer spring brake valve and method of operating the same to determine type of brake priority.

When a vehicle such as a tractor trailer uses spring brake priority, spring brakes are filled with compressed air and thereby released before one or more air reservoirs are filled with compressed air. When the tractor trailer uses service brake priority, both the spring brakes and the one or more air reservoirs are filled with compressed air at the same time. In this case, the service brakes are prioritized since the service brakes are functional as the spring brakes are being filled with compressed air and released. Accordingly, those skilled in the art continue with research and development efforts in the field of vehicle air braking systems capable of spring brake priority or service brake priority.

SUMMARY

In accordance with one embodiment, a trailer spring brake valve is provided for a vehicle air braking system. The trailer spring brake valve comprises a number of components arranged to cooperate together to provide type of brake priority based upon trailer weight.

In accordance with another embodiment, a trailer spring brake valve is provided for a vehicle air braking system. The trailer spring brake valve comprises means for receiving a signal indicative of trailer weight. The trailer spring brake valve also comprises means responsive to the trailer weight signal and for determining type of brake priority to be provided based upon the trailer weight signal.

In accordance with yet another embodiment, a trailer spring brake valve is provided for a vehicle air braking system. The trailer spring brake valve comprises an actuatable solenoid for (i) providing service brake priority when the solenoid is unactuated and trailer weight is above a predetermined weight threshold, and (ii) providing spring brake priority when the solenoid is actuated and the trailer weight is below the predetermined weight threshold. The trailer spring brake valve also comprises a pressure protection valve responsive to pressure of an air supply and disposed between the solenoid and the air supply, wherein (i) the pressure protection valve prevents air from the air supply to pass through the solenoid when the pressure of the air supply is below a predetermined supply pressure threshold, and (ii) the pressure protection valve allows air from the air supply to pass through the solenoid when the pressure of the air supply is above the predetermined supply pressure threshold. The trailer spring brake valve further comprises an anti-compounding valve disposed between the solenoid and a control signal port for receiving a user control signal, and a holding quick release valve disposed between the solenoid and an air delivery port for delivering air to spring brake chambers.

In accordance with still another embodiment, a method of operating a trailer spring brake valve is provided for a vehicle air braking system. The method comprises receiving a signal indicative of trailer weight, and determining type of brake priority to be provided based upon the trailer weight signal.

DETAILED DESCRIPTION

The present application is directed to a trailer spring brake valve and method of operating the same to determine type of brake priority for a vehicle such as a tractor trailer. The specific construction of the trailer spring brake valve may vary. It is to be understood that the disclosure below provides a number of embodiments or examples for implementing different features of various embodiments. Specific examples of components and arrangements are described to simplify the present disclosure. These are merely examples and are not intended to be limiting.

Figure 1:
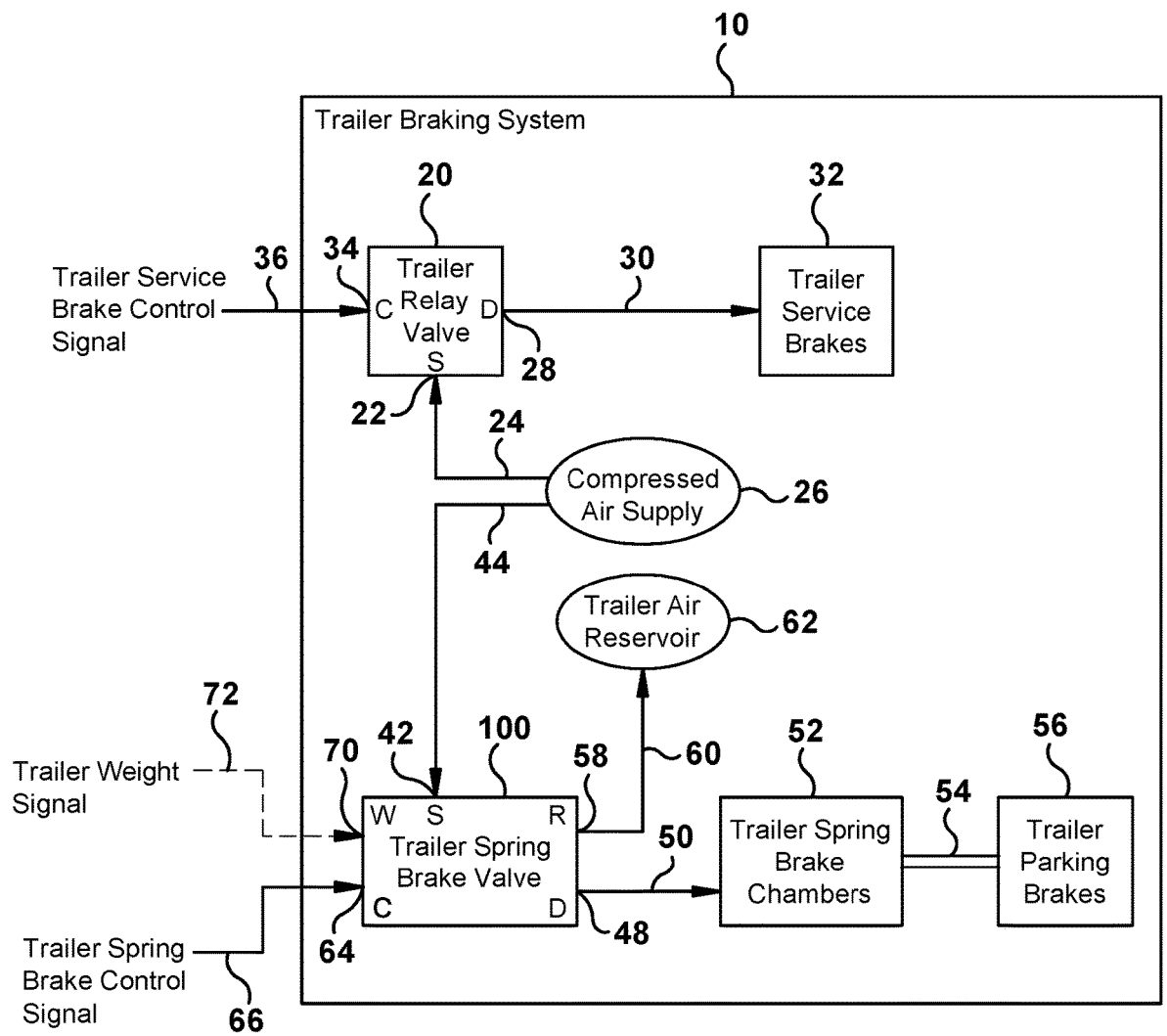
FIG. 1 is a schematic block diagram showing an example tractor trailer embodying a trailer spring brake valve in accordance with the present disclosure.

Referring to FIG. 1, a schematic block diagram showing an example trailer braking system 10 embodying a trailer spring brake valve 100 in accordance with the present disclosure is illustrated. In FIG. 1, pneumatic line connections are shown as solid lines, pneumatic valve feedback connections are shown as short-dashed lines, electrical line connections are shown as long-dashed lines, and mechanical couplings are shown as double solid lines.

Trailer braking system 10 includes a trailer relay valve 20 having a supply port 22 that receives compressed air on line 24 from compressed air supply 26, and a delivery port 28 that provides compressed air on line 30 to trailer service brakes 32. The trailer relay valve 20 also has a control port 34 that receives a trailer service brake control signal on line 36 to apply the trailer service brakes 32. The trailer service brake control signal is typically provided on line 36 in response to a driver depressing a foot brake pedal (not shown) located in the cab of the tractor trailer. Structure and operation of the trailer relay valve 20 in response to the trailer service brake control signal on line 36 to apply the trailer service brakes 32 are conventional and, therefore, will not be further described.

The inventive trailer spring brake valve 100 has a supply port 42 that receives compressed air on line 44 from the compressed air supply 26, and a delivery port 48 that provides compressed air on line 50 to trailer spring brake chambers 52. The trailer spring brake chambers 52 are operatively coupled via line 54 in known manner to trailer parking brakes 56. The trailer spring brake valve 100 also has a reservoir port 58 that provides compressed air on line 60 to recharge and refill trailer air reservoir 62 with compressed air, and a control port 64 that receives a trailer spring brake control signal on line 66 to apply the trailer parking brakes 32. The trailer spring brake control signal is typically provided on line 66 in response to a driver operating a push-pull button (not shown) located in the cab of the tractor trailer. Structure and operation of the trailer spring brake chambers 52 in response to the trailer spring brake control signal on line 66 to apply the trailer parking brakes 56 are conventional and, therefore, will not be further described.

In accordance with an aspect of the present disclosure, the trailer spring brake valve 100 includes a weight signal port 70 that receives a signal on line 72 indicative of trailer weight. The trailer weight signal on line 72 may comprise any type of signal, such as an electrical signal, a pneumatic signal, and a hydraulic signal. Other types of signals indicative of trailer weight are possible. For purpose of description herein, the trailer weight signal on line 72 is an electrical signal. The trailer spring brake valve 100 monitors the trailer weight signal on line 72 and provides spring brake priority or service brake priority based upon the trailer weight, as will be described herein.

When spring brake priority is provided, the trailer spring brake chambers 52 are filled with compressed air to release the trailer parking brakes 56 before the trailer air reservoir 62 is filled with compressed air. The trailer service brakes 32 are not functional until the trailer air reservoir 62 is filled with compressed air. When service brake priority is provided, both the trailer spring brake chambers 52 and the trailer air reservoir 62 are filled with compressed air at the same time. The trailer service brakes 32 are functional as the trailer spring brake chambers 52 and the trailer air reservoir 62 are being filled with compressed air.

Figure 2:
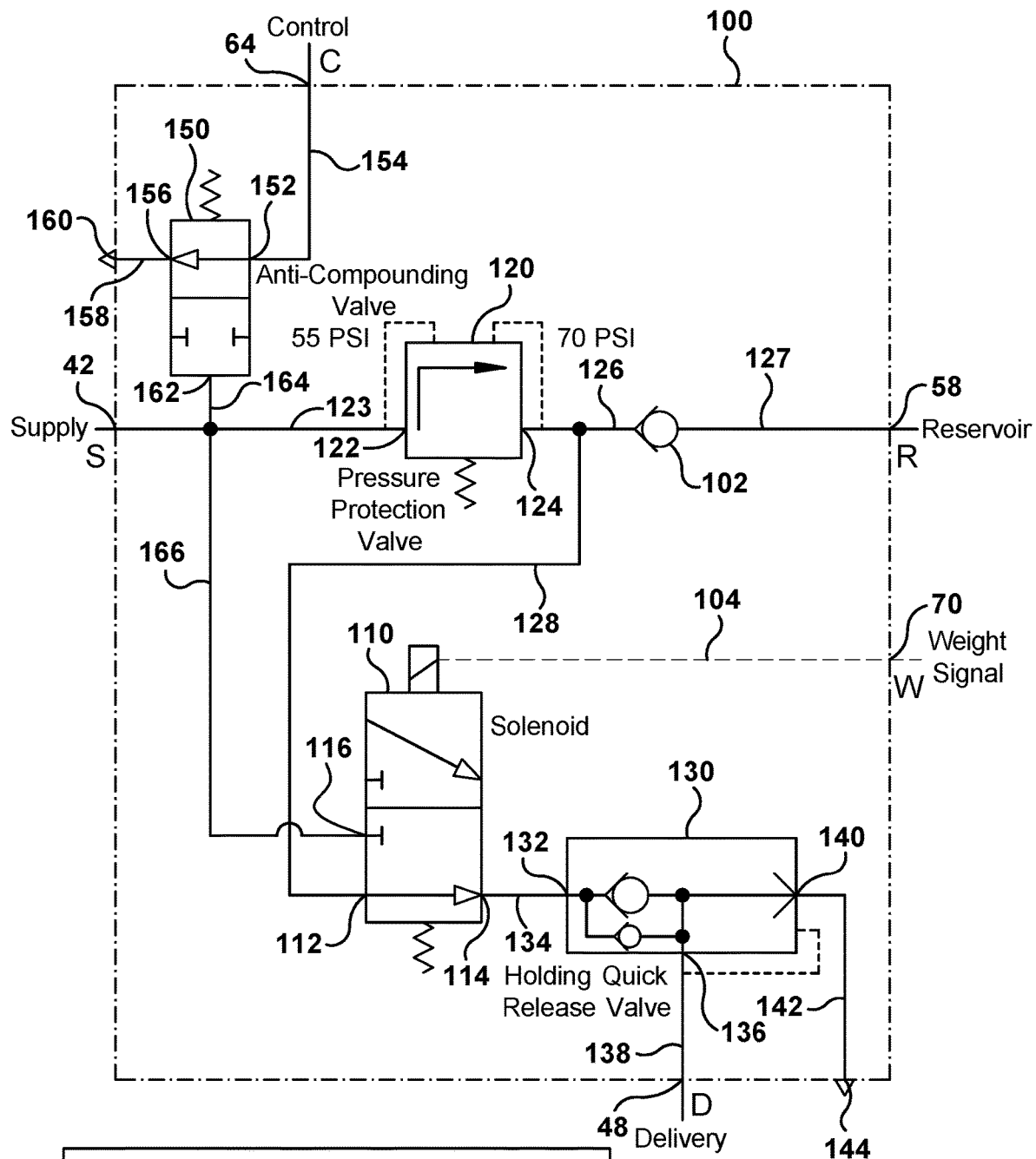
FIG. 2 is a schematic diagram of the trailer spring brake valve of FIG. 1 in accordance with an example implementation, and showing the trailer spring brake valve in an unenergized state.

Referring to FIG. 2, a schematic diagram of the trailer spring brake valve 100 of FIG. 1 in accordance with an example implementation is illustrated, and shows the trailer spring brake valve 100 in an unenergized state. The trailer spring brake valve 100 includes an actuatable solenoid 110 having a first inlet port 112, a first outlet port 114, and a second inlet port 116. The solenoid 110 is responsive to signal on line 104 from the weight signal port 70 that is indicative of trailer weight (i.e., the trailer weight signal on line 72 shown in FIG. 1). The solenoid 110 is in unactuated position as shown in the unenergized state of FIG. 2.

The trailer spring brake valve 100 also includes a pressure protection valve 120 having an inlet port 122 connected via line 123 to the supply port 42, and an outlet port 124 that is connected on line 126 through a check valve 102 via line 127 to the reservoir port 58. The outlet port 124 of the pressure protection valve 120 is also connected via line 128 to the first inlet port 112 of the solenoid 110. The pressure protection valve 120 operates to connect its inlet port 122 and its outlet port 124 in fluid communication with each other to thereby open the valve 120 when the pressure at the inlet port 122 is at a predetermined pressure threshold (e.g., 55 psi). An example implementation of the pressure protection valve 120 is the PR-4™ pressure protection valve, commercially available from Bendix Commercial Vehicle Systems located in Avon, Ohio.

The trailer spring brake valve 100 further includes a holding quick release valve 130 having an input port 132 connected via line 134 to the first outlet port 114 of the solenoid 110, a first outlet port 136 connected via line 138 to the delivery port 48, and a second outlet port 140 that is connected via line 142 to an atmosphere port 144. The holding quick release valve 130 operates to selectively connect to its first outlet port 136 to the delivery port 48 or to its second outlet port 140 to atmosphere via the atmosphere port 144.

The trailer spring brake valve 100 also includes an anti-compounding valve 150 having an input port 152 connected via line 154 to the control port 64, an outlet port 156 connected via line 158 to an atmosphere port 160, and a port 162 that is connected via line 164 to the supply port 42 and the inlet port 122 of the pressure protection valve 120. The port 162 is also connected via line 166 to the second input port 114 of the solenoid 110. The anti-compounding valve 150 operates to vent pressure at the control port 64 to atmosphere if pressure at the supply port 42 is not present. This prevents the trailer parking brakes 56 (FIG. 1) and the trailer service brakes 32 from being applied together at the same time.

When the trailer spring brake valve 100 is in the unenergized state of FIG. 2, the supply air pressure at the supply port 42 is zero psi, the trailer weight signal at the weight signal port 70 is low (i.e., the trailer weight is above a predetermined weight threshold such as the predetermined weight rating of the trailer), and the pressure at the reservoir port 58 is zero (i.e., the trailer air reservoir 62 shown in FIG. 1 is empty). The predetermined weight rating of the trailer may be point at which trailer is loaded or a percentage of maximum load. Also, the trailer is parked (i.e., there is no air in the trailer spring brake chambers 52 shown in FIG. 1), and service brake priority is being provided.

Figure 2A:
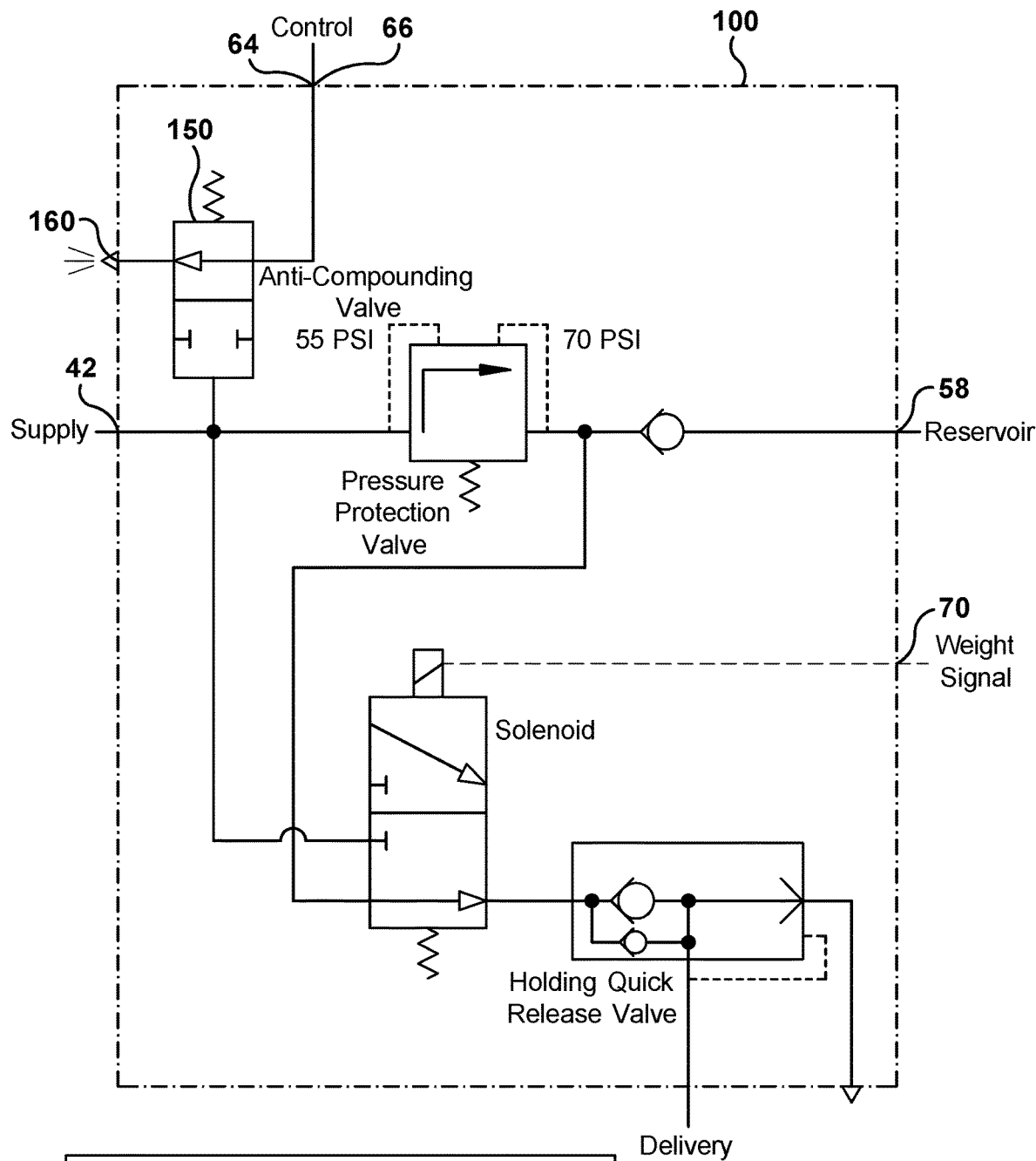
FIG. 2A is schematic diagram similar to FIG. 2, and showing the trailer spring brake valve in an anti-compounding state.

Referring to FIG. 2A, a schematic diagram similar to FIG. 2 is illustrated, and shows the trailer spring brake valve 100 in an anti-compounding state. When the trailer spring brake valve 100 is in the anti-compounding state of FIG. 2A, the supply air pressure at the supply port 42 is zero psi, the trailer weight signal at the weight signal port 70 is low (i.e., the trailer weight is above a predetermined weight threshold), and the pressure at the reservoir port 58 is zero (i.e., the trailer air reservoir 62 shown in FIG. 1 is empty). Also, the trailer is parked (i.e., there is no air in the trailer spring brake chambers 52 shown in FIG. 1), and service brake priority is being provided. In the anti-compounding state of FIG. 2A, the trailer service brake control signal on line 66 at the control port 64 passes through the anti-compounding valve 150 and exhausted to atmosphere at the atmosphere port 160. This prevents the trailer service brakes 32 and the trailer parking brakes 56 shown in FIG. 1 from being applied at the same time.

Figure 2B:
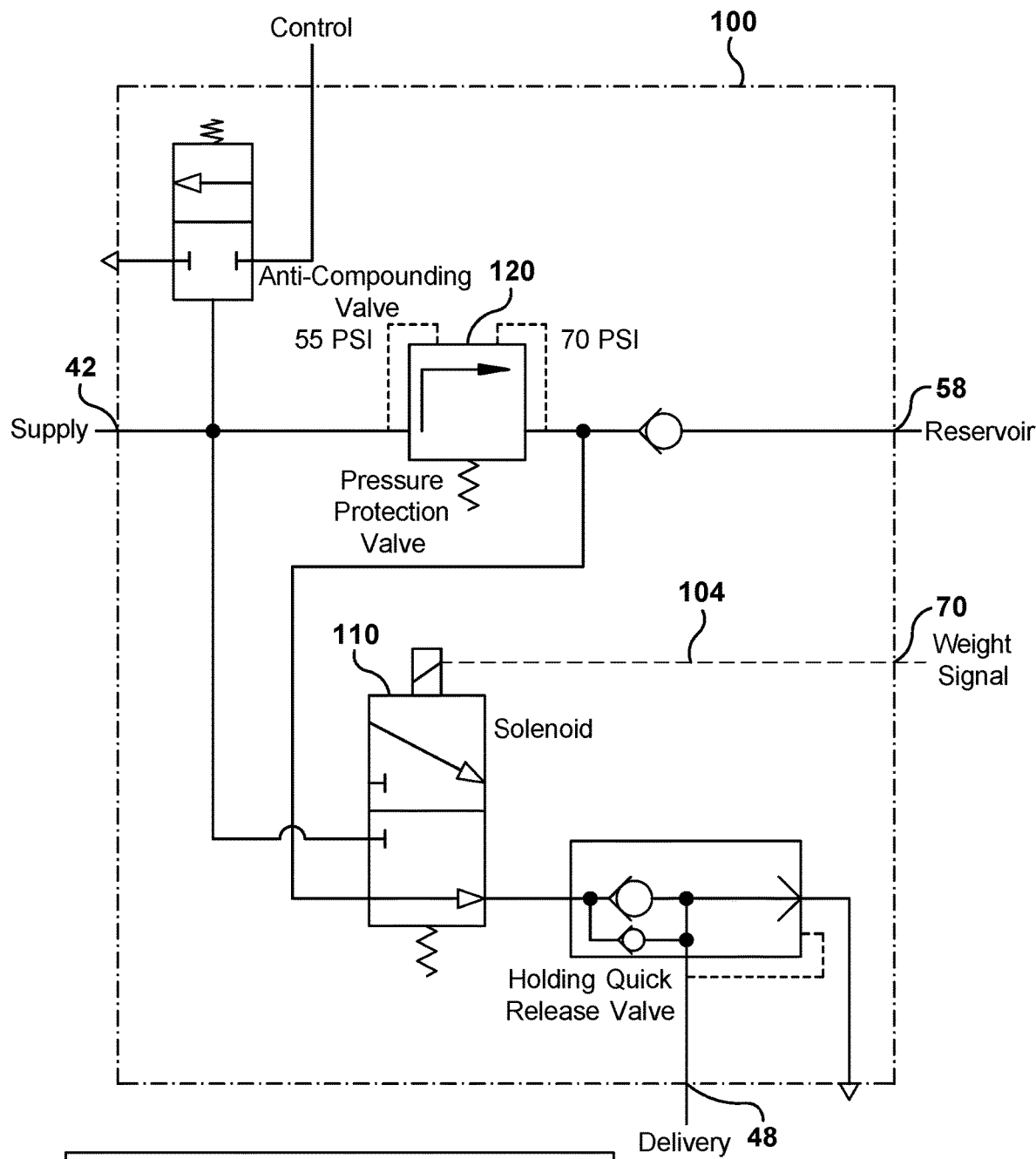
FIG. 2B is schematic diagram similar to FIG. 2, and showing the trailer spring brake valve in a service brake priority state when trailer weight is above a threshold and supply air pressure is below 55 psi.

Referring to FIG. 2B, a schematic diagram similar to FIG. 2 is illustrated, and shows the trailer spring brake valve 100 in a service brake priority state when trailer weight as indicated on line 104 to the solenoid 110 is above a predetermined weight threshold and supply air pressure at the inlet port 122 of the pressure protection valve 120 is below 55 psi. When the trailer spring brake valve 100 is in the service brake priority state of FIG. 2A, the supply air pressure at the supply port 42 is less than 55 psi, the trailer weight signal at the weight signal port 70 is low (i.e., the trailer weight is above a predetermined weight threshold), and the pressure at the reservoir port 58 is zero (i.e., the trailer air reservoir 62 shown in FIG. 1 is empty). Also, the trailer is parked (i.e., there is no air in the trailer spring brake chambers 52 shown in FIG. 1), and service brake priority is being provided. The pressure protection valve 120 is closed, and the solenoid 110 is in its unactuated position (i.e., the service brake priority position) and does not allow air to pass therethrough to the delivery port 48 to the trailer spring brake chambers 52 (FIG. 1).

Figure 2C:
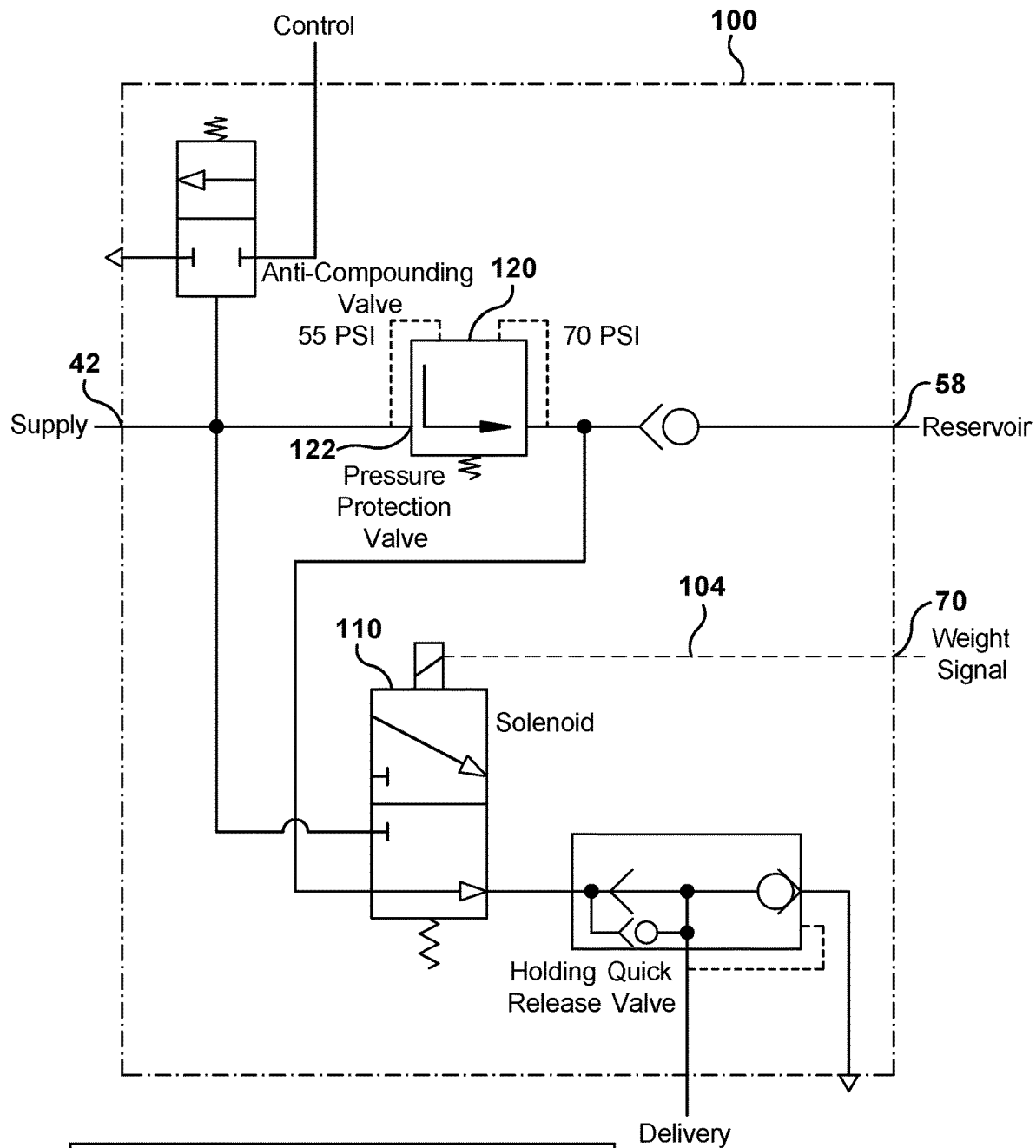
FIG. 2C is schematic diagram similar to FIG. 2, and showing the trailer spring brake valve in a service brake priority state when trailer weight is above a threshold and supply air pressure is above 55 psi.

Referring to FIG. 2C, a schematic diagram similar to FIG. 2 is illustrated, and shows the trailer spring brake valve 100 in a service brake priority state when trailer weight as indicated on line 104 to the solenoid 110 is above a predetermined threshold weight and supply air pressure at the inlet port 122 of the pressure protection valve 120 is above 55 psi. When the trailer spring brake valve 100 is in the service brake priority state of FIG. 2C, the supply air pressure at the supply port 42 is above 55 psi, and the trailer weight signal at the weight signal port 70 is low (i.e., the trailer weight is above a predetermined weight threshold). The pressure protection valve 120 opens to allow the trailer air reservoir 62 and the trailer spring brake chambers 52 to be filled with air at the same time. The pressure at the reservoir port 58 increases as the trailer air reservoir 62 (FIG. 1) is being filled with air. Service brake priority is being provided as the trailer air reservoir 62 and the trailer spring brake chambers 52 are being filled with air at the same time.

Figure 2D:
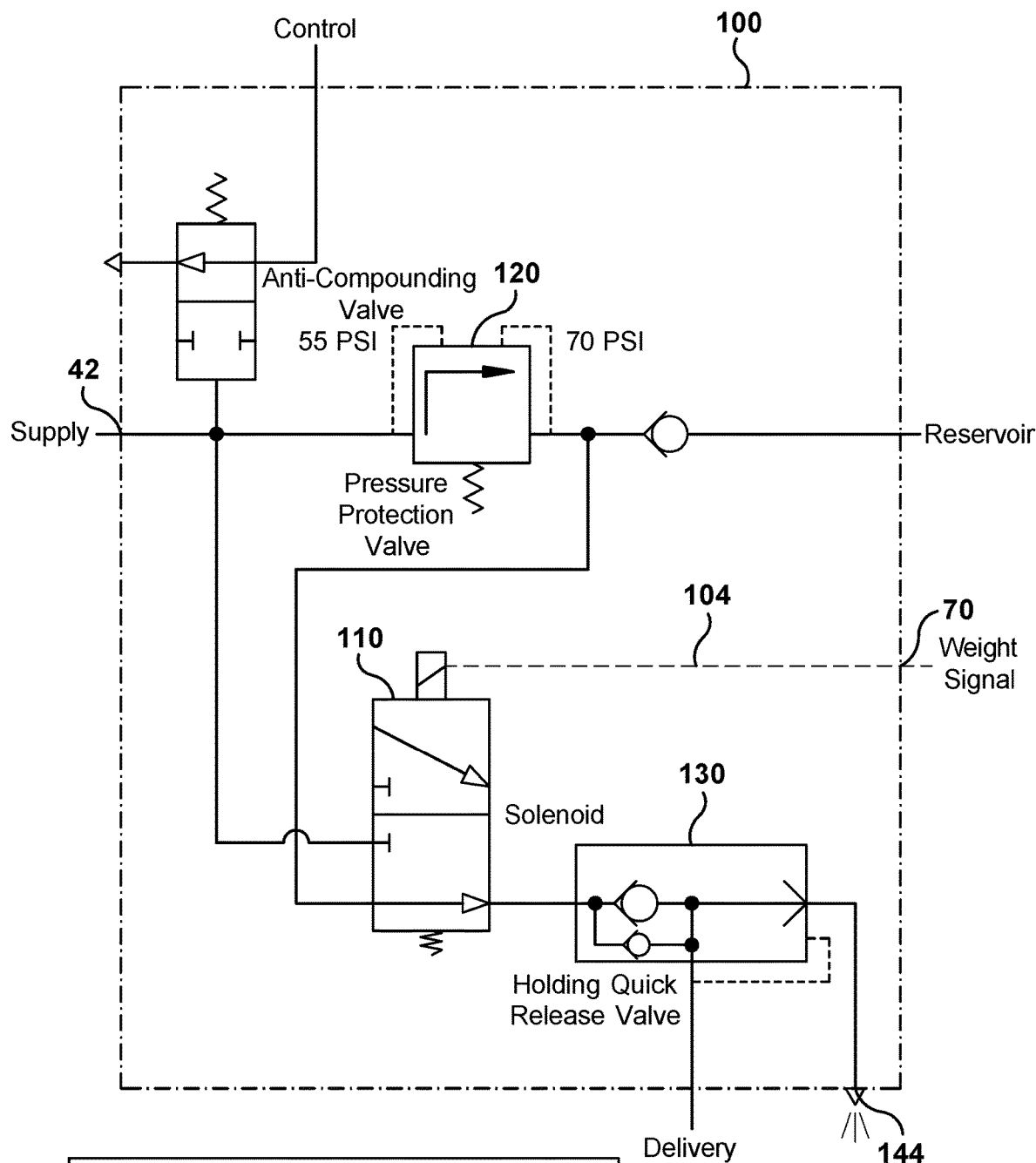
FIG. 2D is schematic diagram similar to FIG. 2, and showing the trailer spring brake valve in a service brake priority state when trailer weight is above a threshold and the trailer is parked.

Referring to FIG. 2D, a schematic diagram similar to FIG. 2 is illustrated, and shows the trailer spring brake valve 100 in a service brake priority state when trailer weight as indicated on line 104 to the solenoid 110 is above a predetermined threshold weight and the trailer is parked. When the trailer spring brake valve 100 is in the service brake priority state of FIG. 2D, the supply air pressure at the supply port 42 is zero psi, and the trailer weight signal at the weight signal port 70 is low (i.e., the trailer weight is above a predetermined weight threshold). The pressure protection valve 120 is closed, the holding quick release valve 130 exhausts the trailer spring brake chambers 52 to atmosphere through the atmosphere port 144, and the pressure at the reservoir port 58 is maintained at the last highest level. The trailer is parked (i.e., there is no air in the trailer spring brake chambers 52 shown in FIG. 1), and service brake priority is being provided.

Figure 2E:
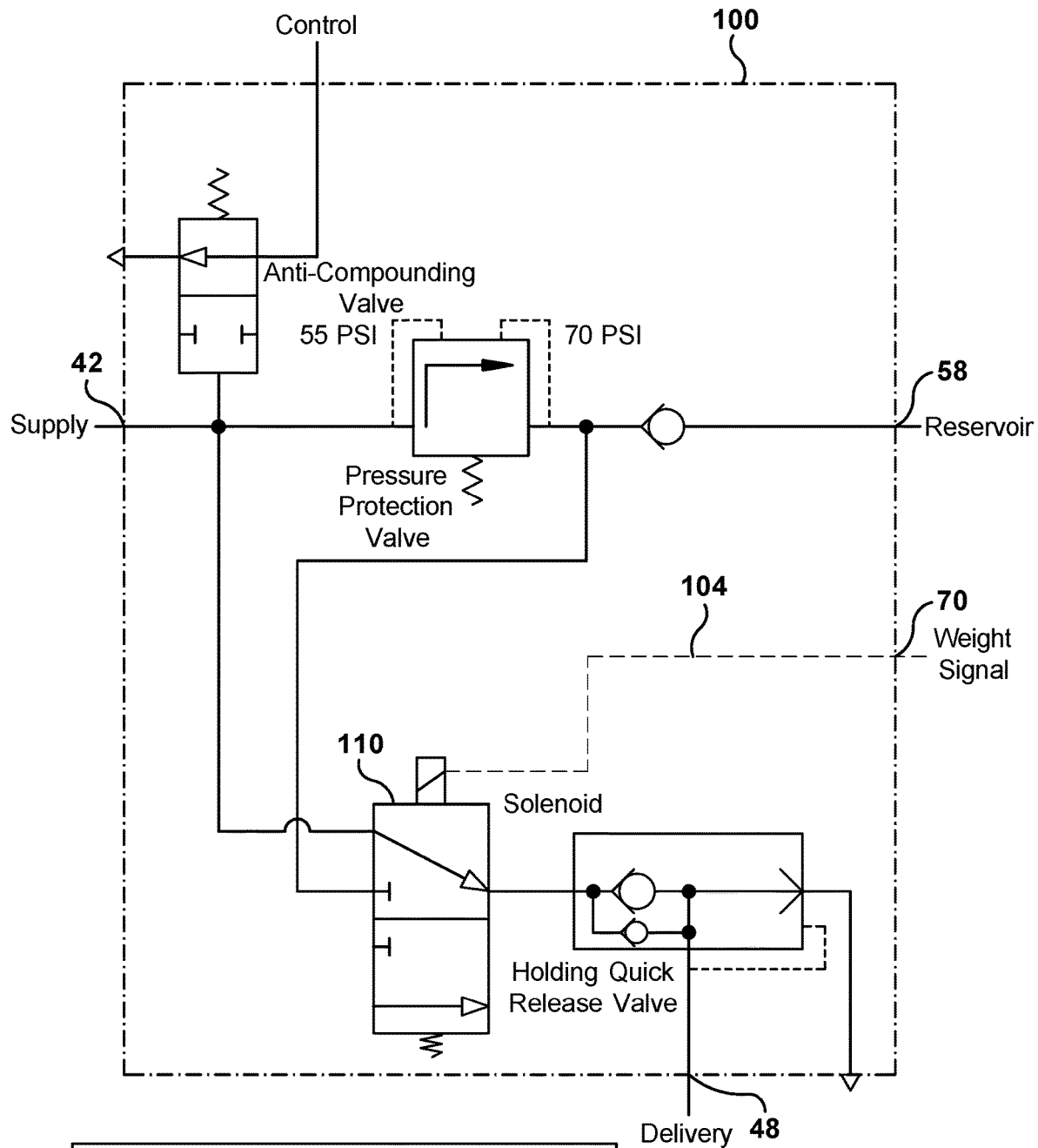
FIG. 2E is schematic diagram similar to FIG. 2, and showing the trailer spring brake valve in a spring brake priority state when trailer weight is below a threshold.

Referring to FIG. 2E, a schematic diagram similar to FIG. 2 is illustrated, and shows the trailer spring brake valve 100 in a spring brake priority state when trailer weight as indicated on line 104 to the solenoid 110 is below a predetermined threshold weight. When the trailer spring brake valve 100 is in the spring brake priority state of FIG. 2E, the supply air pressure at the supply port 42 is at zero psi, the trailer weight signal at the weight signal port 70 is high (i.e., the trailer weight is below a predetermined weight threshold), and the pressure at the reservoir port 58 is zero (i.e., the trailer reservoir 62 shown in FIG. 1 is empty). The trailer is parked (i.e., there is no air in the trailer spring brake chambers 52 shown in FIG. 1), and spring brake priority is being provided. The pressure protection valve 120 is closed, and the solenoid 110 is in its actuated position (i.e., the spring brake priority position) and allows air to pass therethrough to the delivery port 48 to the trailer spring brake chambers 52 (FIG. 1).

Figure 2F:
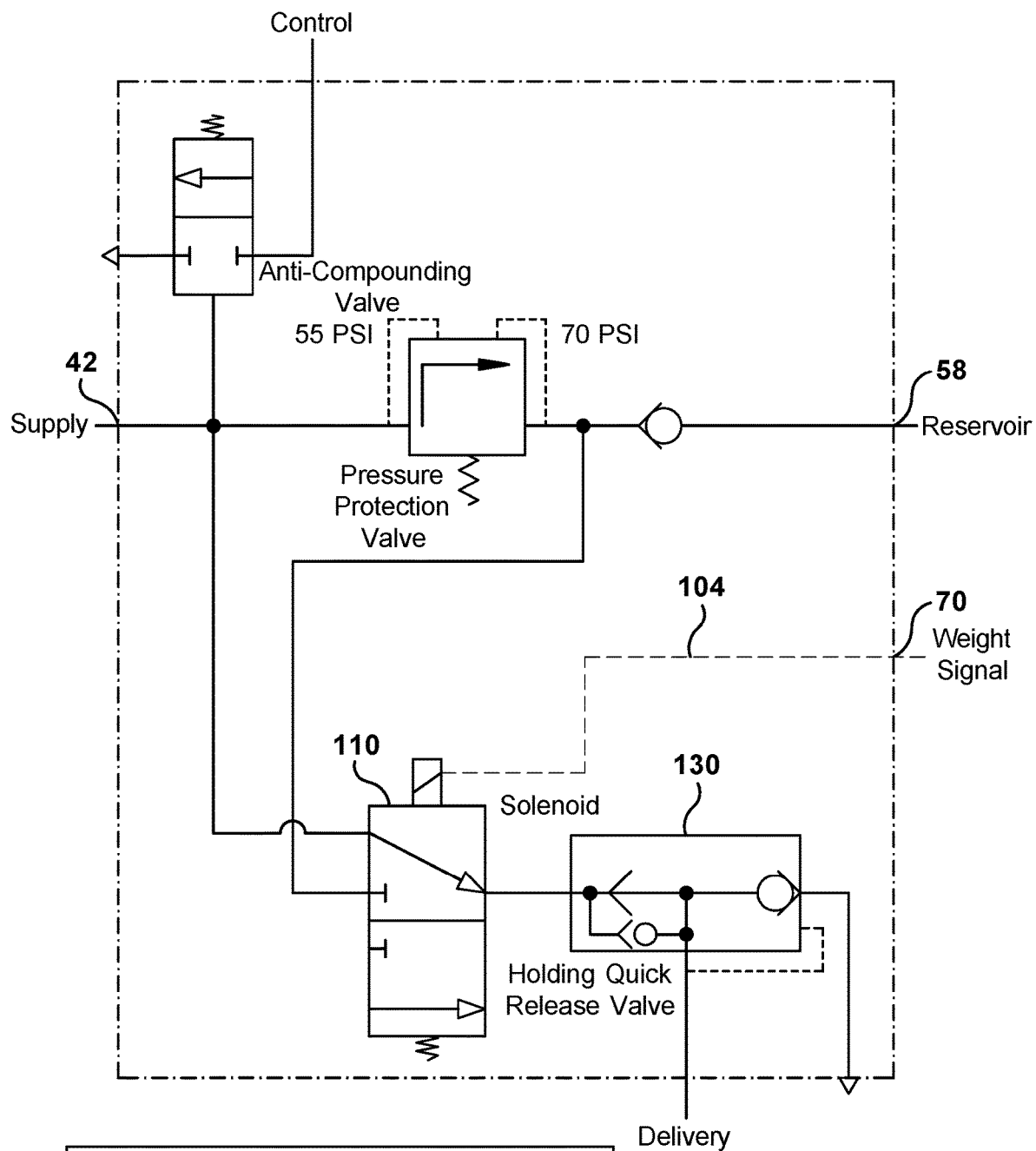
FIG. 2F is schematic diagram similar to FIG. 2, and showing the trailer spring brake valve in a spring brake priority state when trailer weight is below a threshold and supply air pressure is below 55 psi.

Referring to FIG. 2F, a schematic diagram similar to FIG. 2 is illustrated, and shows the trailer spring brake valve 100 in a spring brake priority state when trailer weight as indicated on line 104 to the solenoid 110 is below a predetermined weight threshold and supply air pressure is below 55 psi. When the trailer spring brake valve 100 is in the spring brake priority state of FIG. 2F, the supply air pressure at the supply port 42 is below 55 psi, the trailer weight signal at the weight signal port 70 is high (i.e., the trailer weight is below a predetermined weight threshold), and the pressure at the reservoir port 58 is zero (i.e., the trailer air reservoir 62 shown in FIG. 1 is empty). The trailer spring brake chambers 52 shown in FIG. 1 begins to be filled with supply air through the solenoid 110 and the holding quick release valve 130. Spring brake priority is being provided as the trailer spring brake chambers 52 are being filled with air.

Figure 2G:
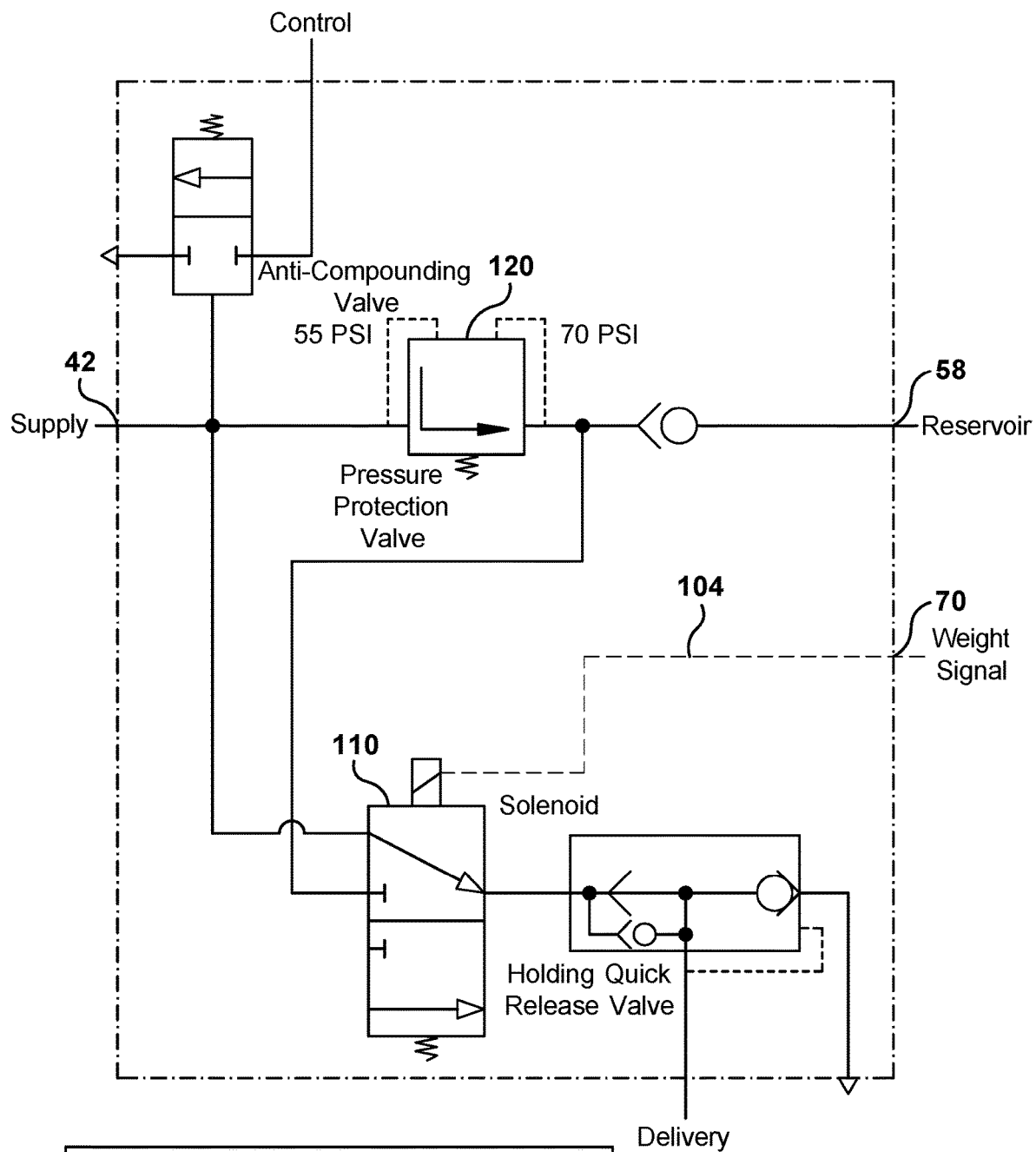
FIG. 2G is schematic diagram similar to FIG. 2, and showing the trailer spring brake valve in a spring brake priority state when trailer weight is below a threshold and supply air pressure is above 55 psi.

Referring to FIG. 2G, a schematic diagram similar to FIG. 2 is illustrated, and shows the trailer spring brake valve 100 in a spring brake priority state when trailer weight as indicated on line 104 to the solenoid 110 is below a threshold and supply air pressure is above 55 psi. When the trailer spring brake valve 100 is in the spring brake priority state of FIG. 2G, the supply air pressure at the supply port 42 is above 55 psi, and the trailer weight signal at the weight signal port 70 is high (i.e., the trailer weight is below a predetermined weight threshold). The pressure protection valve 120 opens, and the trailer air reservoir 62 begins to fill with air. The pressure at the reservoir port 58 is increasing as the trailer air reservoir 62 is being filled with air. The trailer spring brake chambers 52 shown in FIG. 1 are also being filled with air.

Figure 2H:
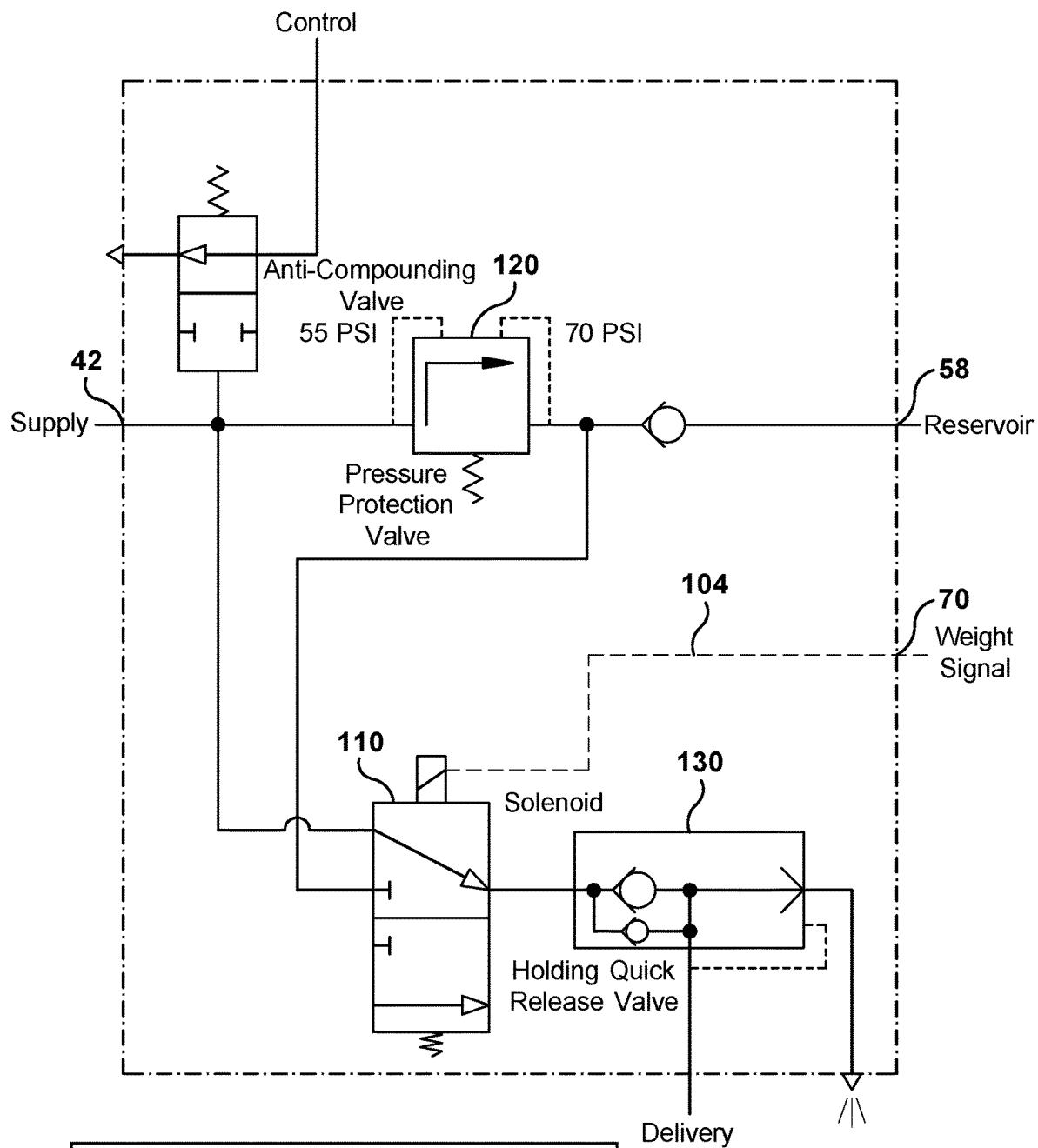
FIG. 2H is schematic diagram similar to FIG. 2, and showing the trailer spring brake valve in a spring brake priority state when trailer weight is below a threshold and the trailer is parked.

Referring to FIG. 2H, a schematic diagram similar to FIG. 2 is illustrated, and shows the trailer spring brake valve 100 in a spring brake priority state when trailer weight as indicated on line 104 to the solenoid 110 is below a threshold and the trailer is parked. When the trailer spring brake valve 100 is in the spring brake priority state of FIG. 2H, the supply air pressure at the supply port 42 is zero psi, and the trailer weight signal at the weight signal port 70 is high (i.e., the trailer weight is below a predetermined weight threshold). The pressure protection valve 120 closes, and the holding quick release valve 130 exhausts the trailer spring brake chambers 52 to atmosphere through the atmosphere port 144. The pressure at the reservoir port 58 is maintained at the last highest level. The trailer is parked (i.e., there is no air in the trailer spring brake chambers 52 shown in FIG. 1), and spring brake priority is being provided.

Figure 3:
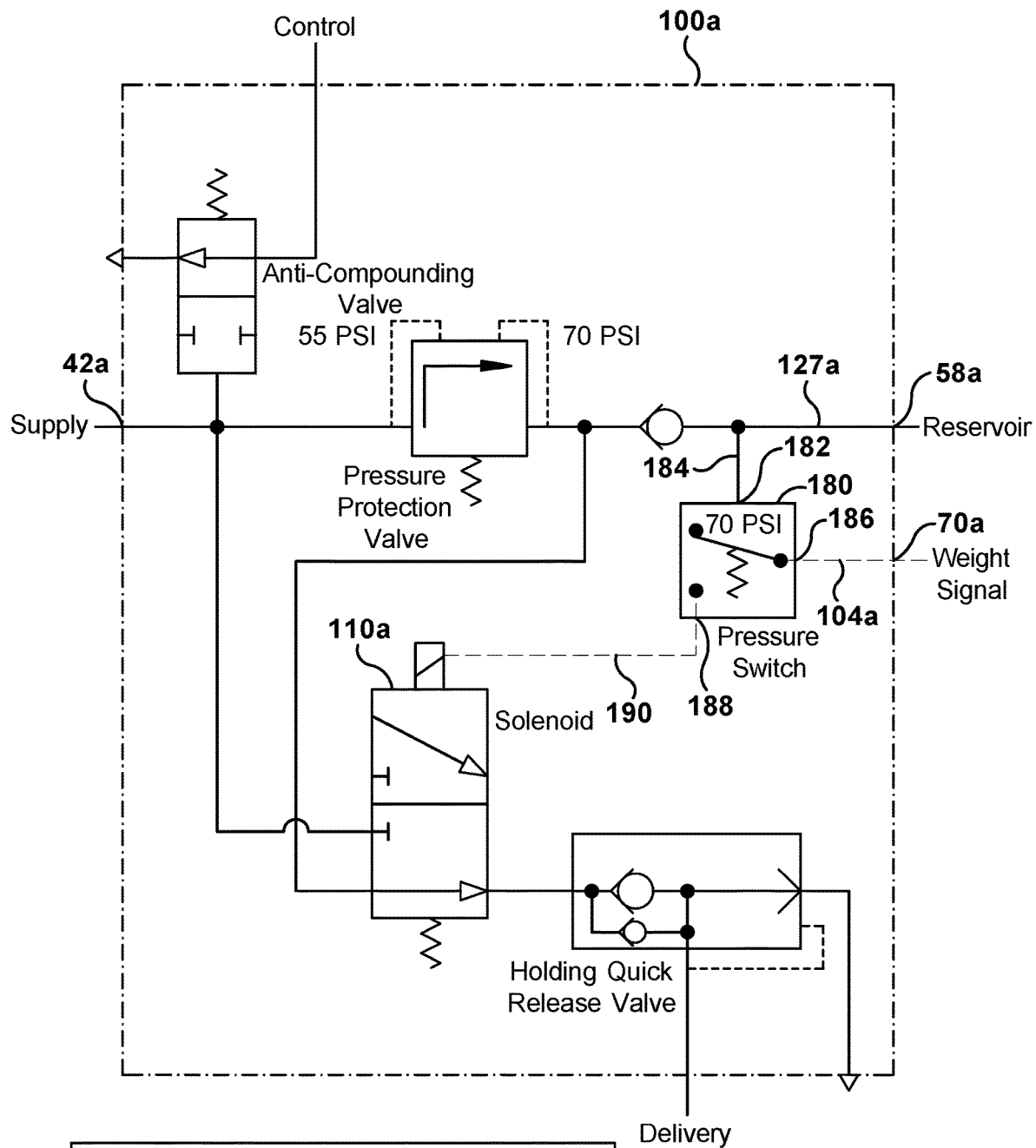
FIG. 3 is a schematic diagram of the trailer spring brake valve of FIG. 1 in accordance with another example implementation, and showing the trailer spring brake valve in an unenergized state.

Another implementation of a trailer spring brake valve is illustrated in FIG. 3. Since the implementation illustrated in FIG. 3 is generally similar to the implementation illustrated in FIG. 2, similar numerals are utilized to designate similar components, the suffix letter "a" being associated with the implementation of FIG. 3 to avoid confusion.

Referring to FIG. 3, a schematic diagram of the trailer spring brake valve 100*a* is illustrated. FIG. 3 shows the trailer spring brake valve 100*a* in an unenergized state. The trailer spring brake valve 100*a* includes a pressure switch 180 having a pneumatic port 182 that is connected via line 184 to line 127*a* to reservoir port 58*a*. The pressure switch 180 also has an electrical input port 186 that is connected via line 104*a* to weight signal port 70*a*, and an electrical output port 188 that is connected via line 190 to solenoid 110*a*. The electrical input port 186 and the electrical output port 188 are not electrically connected when the pressure in line 184 at port 182 is below 70 psi, and are electrically connected when the pressure in line 184 at port 182 is above 70 psi.

When the trailer spring brake valve 100*a* is in the unenergized state of FIG. 3, the supply air pressure at the supply port 42*a* is zero psi, the trailer weight signal at weight signal port 70*a* is low (i.e., the trailer weight is above a predetermined weight threshold), and the pressure at reservoir port 58*a* is zero (i.e., the trailer air reservoir 62 shown in FIG. 1 is empty). The trailer is parked (i.e., there is no air in the trailer spring brake chambers 52 shown in FIG. 1), and service brake priority is being provided.

Figure 3A:
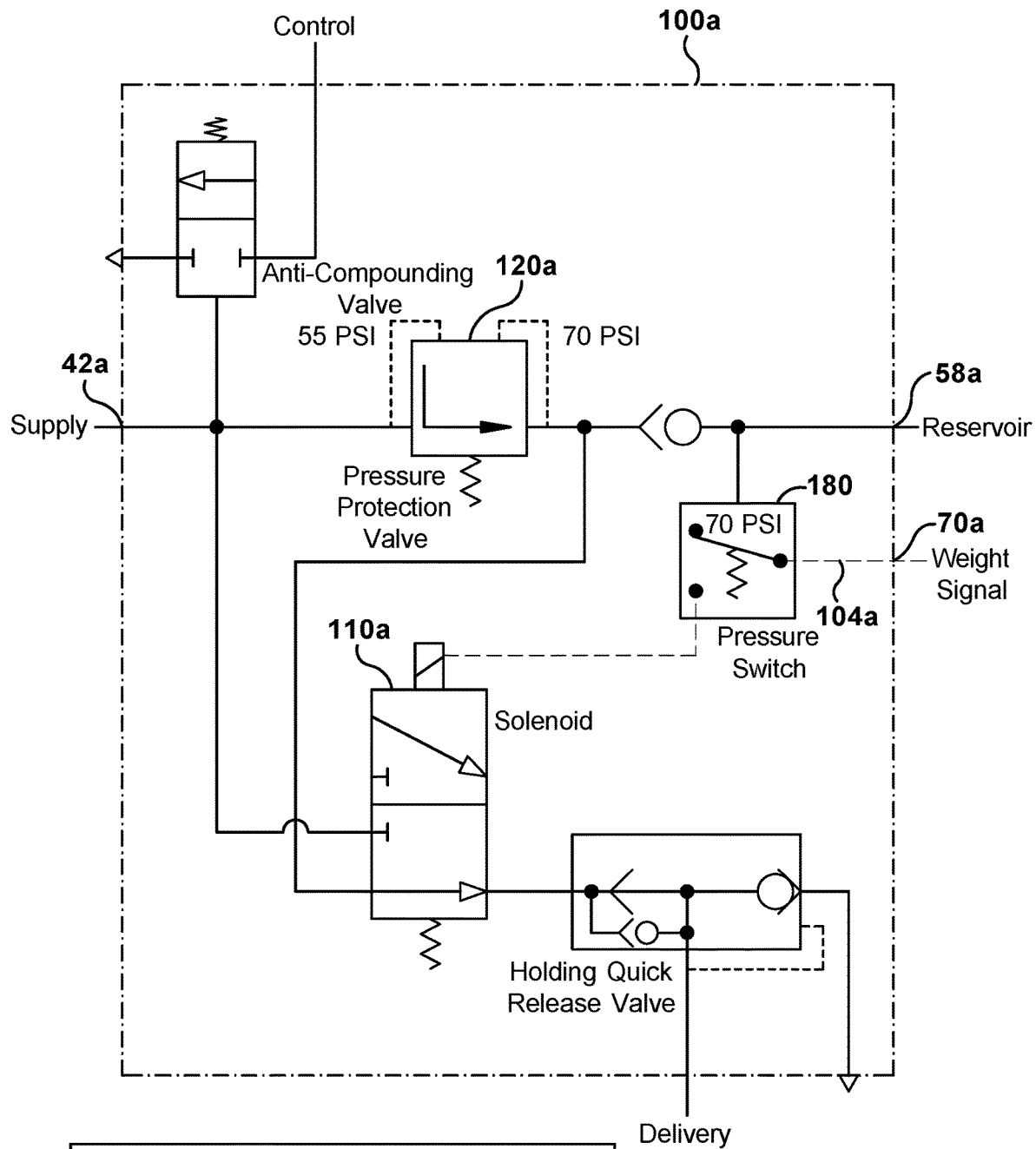
FIG. 3A is schematic diagram similar to FIG. 3, and showing the trailer spring brake valve in a service brake priority state when trailer weight is above a threshold and reservoir air pressure is low.

Referring to FIG. 3A, a schematic diagram similar to FIG. 3 is illustrated, and shows the trailer spring brake valve 100*a* in a service brake priority state when trailer weight as indicated on line 104*a* to the solenoid 110*a* is above a predetermined weight threshold and reservoir air pressure at reservoir port 58*a* is low. When the trailer spring brake valve 100*a* is in the service brake priority state of FIG. 3A, the supply air pressure at the supply port 42*a* is between 55 psi and 70 psi, and the trailer weight signal at the weight signal port 70*a* is low (i.e., the trailer weight is above a predetermined weight threshold). The pressure protection valve 120*a* is open to allow the trailer air reservoir 62 (FIG. 1) and the trailer spring brake chambers 52 to be filled with air at the same time. The pressure at the reservoir port 58*a* is increasing as the trailer air reservoir 62 (FIG. 1) is being filled with air. Service brake priority is being provided as the trailer air reservoir 62 and the trailer spring brake chambers 52 are being filled with air at the same time. The pressure switch 180 is open. As such, service brake priority is provided regardless of the trailer weight signal at the weight signal port 70*a*.

Figure 3B:
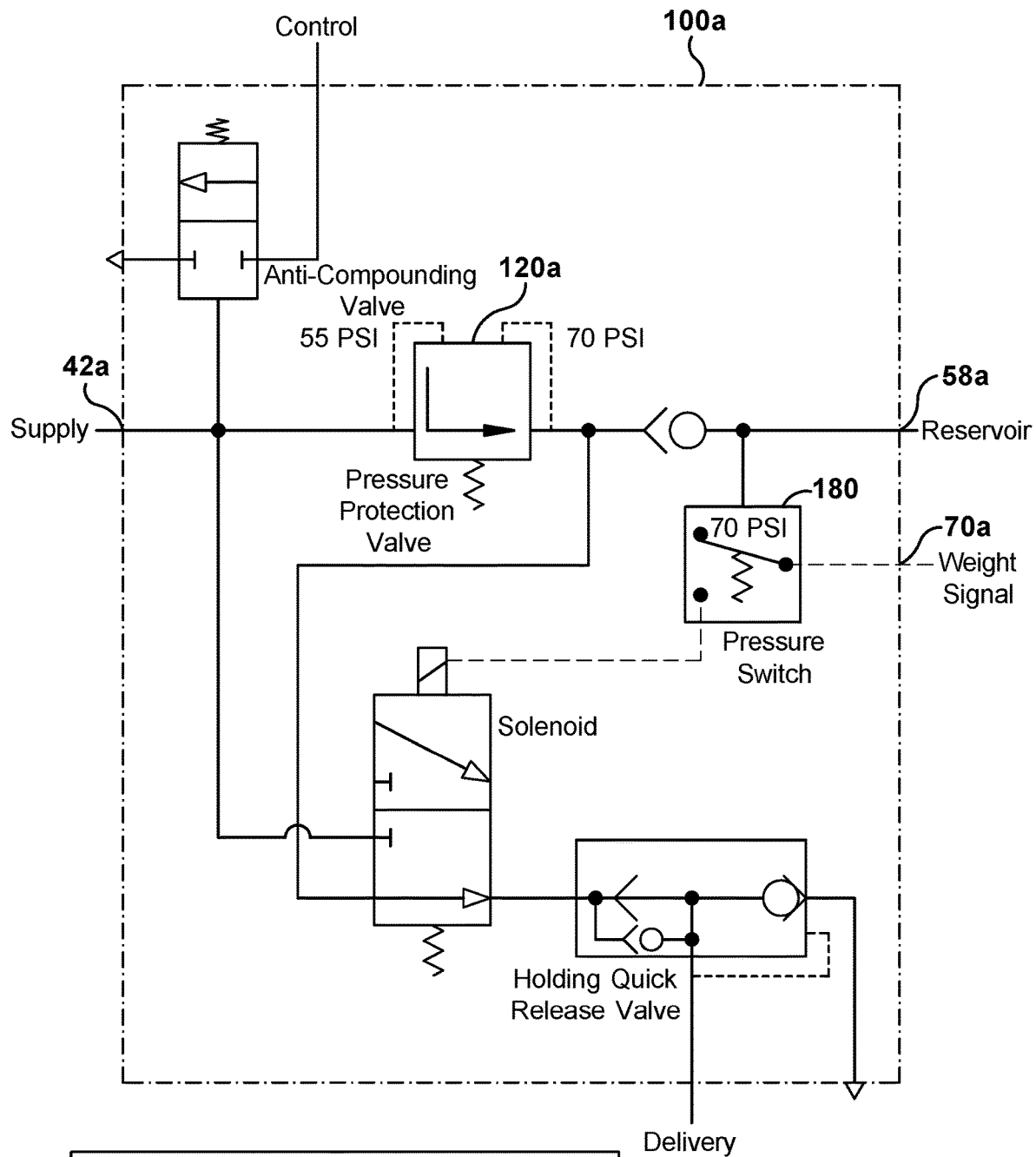
FIG. 3B is schematic diagram similar to FIG. 3, and showing the trailer spring brake valve in a service brake priority state when trailer weight is below a threshold and reservoir air pressure is low.

Referring to FIG. 3B, a schematic diagram similar to FIG. 3 is illustrated, and shows the trailer spring brake valve 100*a* in a service brake priority state when trailer weight as indicated on line 104 at the weight signal port 70*a* is below a threshold and reservoir air pressure at reservoir port 58*a* is low. When the trailer spring brake valve 100*a* is in the service brake priority state of FIG. 3B, the supply air pressure at the supply port 42*a* is between 55 psi and 70 psi, and the trailer weight signal at the weight signal port 70*a* is high (i.e., the trailer weight is below a predetermined weight threshold). The pressure protection valve 120*a* is open to allow the trailer air reservoir 62 (FIG. 1) and the trailer spring brake chambers 52 to be filled with air at the same time. The pressure at the reservoir port 58*a* is increasing as the trailer air reservoir 62 (FIG. 1) is being filled with air, and the trailer spring brake chambers 52 (FIG. 1) are being filled with air. The pressure switch 180 is open when the reservoir air pressure is below 70 psi. In this case, service brake priority is provided regardless of the trailer weight signal at the weight signal port 70*a*. The pressure switch 180 closes when the pressure at the pneumatic port 182 of the pressure switch 180 reaches 70 psi.

Figure 3C:
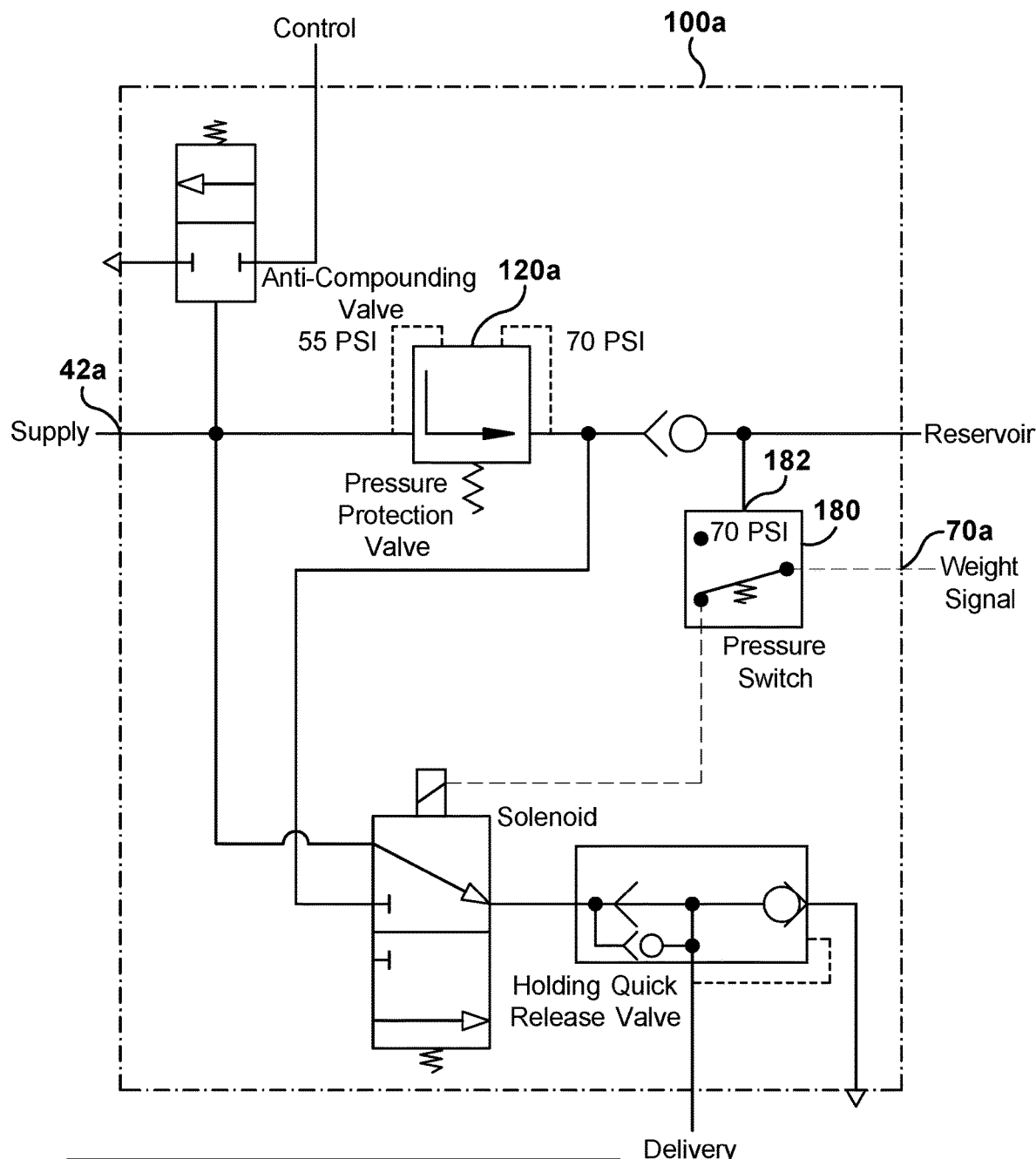
FIG. 3C is schematic diagram similar to FIG. 3, and showing the trailer spring brake valve transitioning from service brake priority state to spring brake priority state.

Referring to FIG. 3C, a schematic diagram similar to FIG. 3 is illustrated, and shows the trailer spring brake valve 100*a* transitioning from service brake priority to spring brake priority. As the trailer spring brake valve 100*a* is transitioning from service brake priority to spring brake priority, the supply air pressure at the supply port 42*a* is above 70 psi, and the trailer weight signal at the weight signal port 70*a* is high (i.e., the trailer weight is below a predetermined weight threshold). The pressure protection valve 120*a* is open to allow the trailer air reservoir 62 (FIG. 1) and the trailer spring brake chambers 52 to be filled with air at the same time. The pressure at the reservoir port 58*a* is increasing as the trailer air reservoir 62 (FIG. 1) is being filled with air. When the pressure at the pneumatic port 182 of the pressure switch 180 reaches 70 psi, the pressure switch 180 closes. Service brake priority is transitioned to spring brake priority as the pressure switch 180 closes.

Figure 3D:
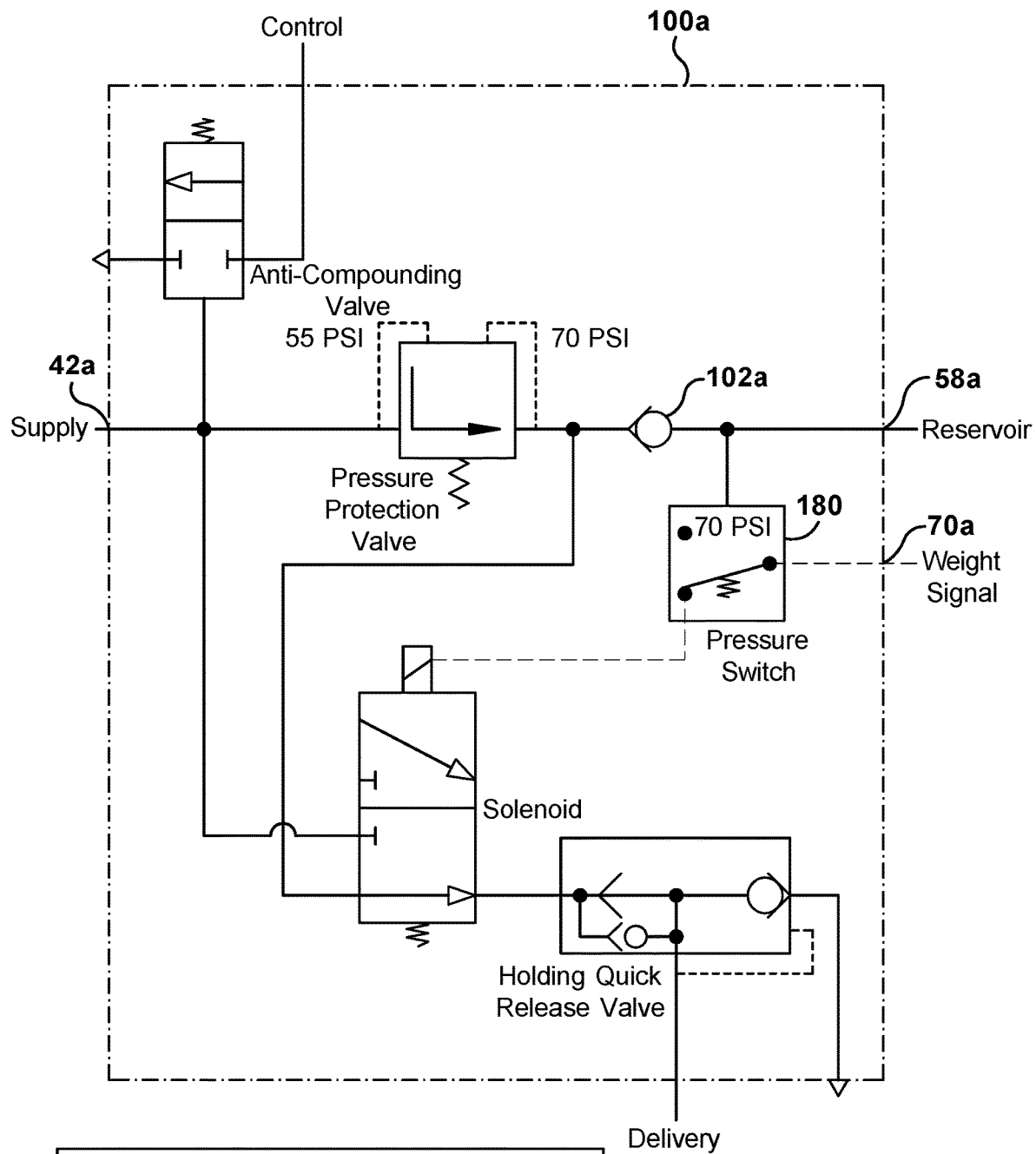
FIG. 3D is schematic diagram similar to FIG. 3, and showing the trailer spring brake valve in a service brake priority state when trailer weight is above a threshold, supply air pressure is low, and reservoir air pressure is above 70 psi.

Referring to FIG. 3D, a schematic diagram similar to FIG. 3 is illustrated, and shows the trailer spring brake valve 100*a* in a service brake priority state when trailer weight as indicated at weight signal port 70 is above a predetermined weight threshold, supply air pressure at supply port 42*a* is low, and reservoir air pressure at reservoir port 58*a* is above 70 psi. When the trailer spring brake valve 100*a* is in the service brake priority state of FIG. 3D, the supply air pressure at the supply port 42*a* is between 55 psi and 70 psi, the trailer weight signal at the weight signal port 70*a* is low (i.e., the trailer weight is above a predetermined weight threshold), and the pressure in the trailer air reservoir 62 (FIG. 1) is above 70 psi. The trailer spring brake chambers 52 (FIG. 1) are being filled with air. Service brake priority is being provided as the trailer spring brake chambers 52 are being filled with air. Since the pressure at the reservoir port 58*a* is above 70 psi and the pressure at the supply port 42*a* is less than 70 psi, check valve 102*a* is closed and the pressure switch 180 is closed. As such, the brake priority is dependent upon the trailer weight signal at the weight signal port 70*a*. The trailer spring brake valve 100*a* is shown in FIG. 3D with service brake priority.

Figure 3E:
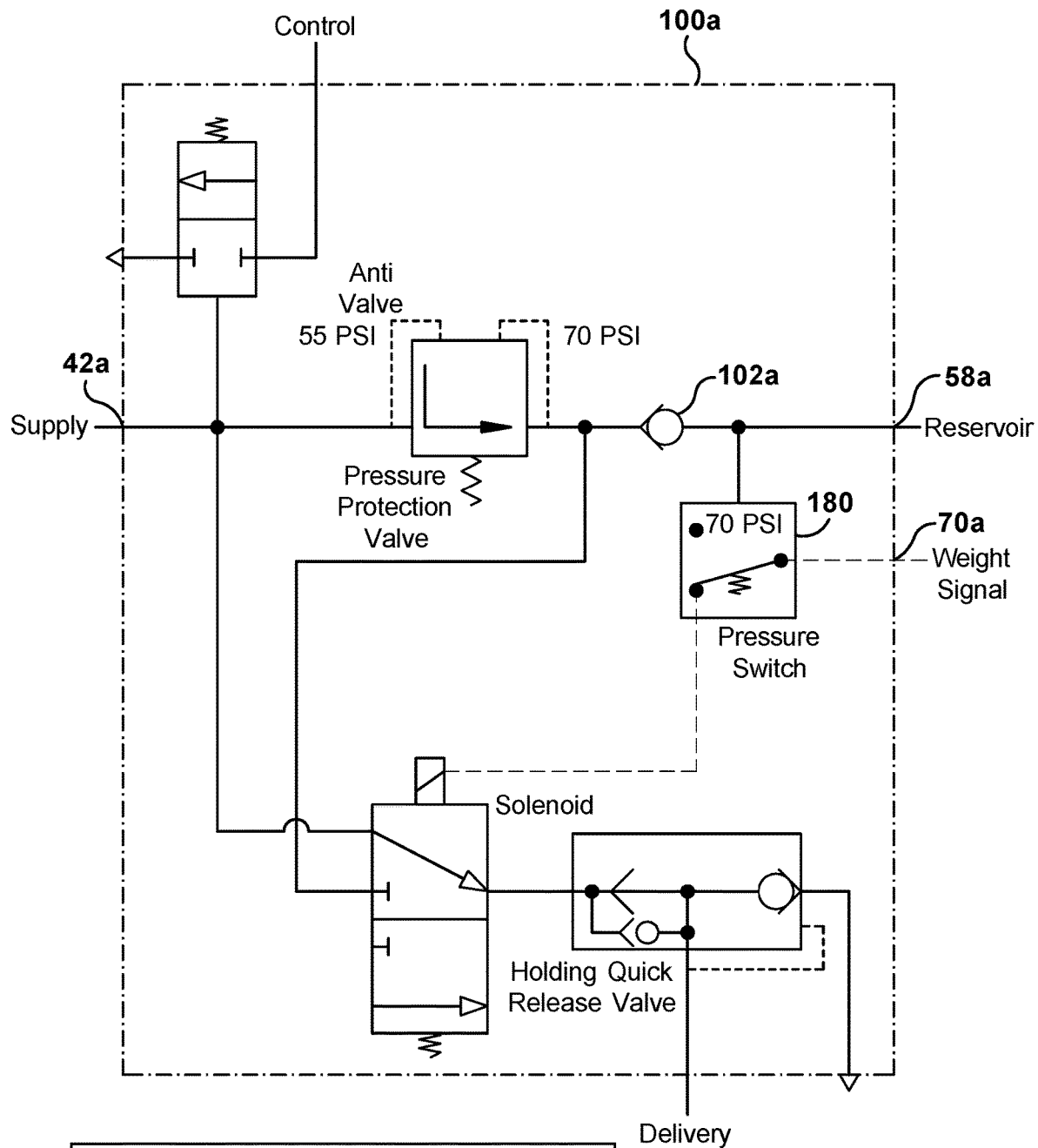
FIG. 3E is schematic diagram similar to FIG. 3, and showing the trailer spring brake valve in a spring brake priority state when trailer weight is below a threshold, supply air pressure is low, and reservoir air pressure is above 70 psi.

Referring to FIG. 3E, a schematic diagram similar to FIG. 3 is illustrated, and shows the trailer spring brake valve 100*a* in a spring brake priority state when trailer weight as indicated at weight signal port 70*a* is below a threshold, supply air pressure at supply port 42*a* is low, and reservoir air pressure is above 70 psi. When the trailer spring brake valve 100*a* is in spring brake priority of FIG. 3E, the supply air pressure at the supply port 42*a* is between 55 psi and 70 psi, the trailer weight signal at the weight signal port 70a is high (i.e., the trailer weight is below a predetermined weight threshold), and reservoir air pressure at reservoir port 58a is above 70 psi. Since the pressure at the reservoir port 58a is above 70 psi and the pressure at the supply port 42a is less than 70 psi, check valve 102a is closed and the pressure switch 180 is closed. As such, the type of brake priority is dependent upon the trailer weight signal at the weight signal port 70a. The trailer spring brake valve 100a is shown in FIG. 3D with spring brake priority as the trailer spring brake chambers 52 (FIG. 1) are being filled with air.

It should be apparent that brake priority (i.e., service brake priority mode or spring brake priority mode) is self-determined by the trailer spring brake valve 100 of FIG. 2 and the trailer spring brake valve 100a of FIG. 3. The brake priority mode depends upon trailer weight (FIG. 2) or trailer weight along with pressure in the trailer air reservoir 62 (FIG. 3).

It should also be apparent that (i) service brake priority is provided when the solenoid 110, 110a is unactuated and the trailer weight is above a predetermined weight threshold, and (ii) spring brake priority is provided when the solenoid 110, 110a is actuated and the trailer weight is below the predetermined weight threshold It should further be apparent that (i) the solenoid 110a is unresponsive to the trailer weight signal when the pressure switch 180 detects that pressure in the trailer air reservoir 62 is below a predetermined reservoir pressure threshold, and (ii) the solenoid 110a is responsive to the trailer weight signal when the pressure switch 180 detects that pressure in the trailer air reservoir 62 is above the predetermined reservoir pressure threshold.

It should also be apparent that (i) service brake priority is provided independent of the trailer weight signal when the pressure switch 180 detects that pressure in the trailer air reservoir 62 is below a predetermined reservoir pressure threshold, and (ii) type of brake priority is provided dependent upon the trailer weight signal when the pressure switch 180 detects that pressure in the trailer air reservoir 62 is above the predetermined reservoir pressure threshold.

Figure 4:
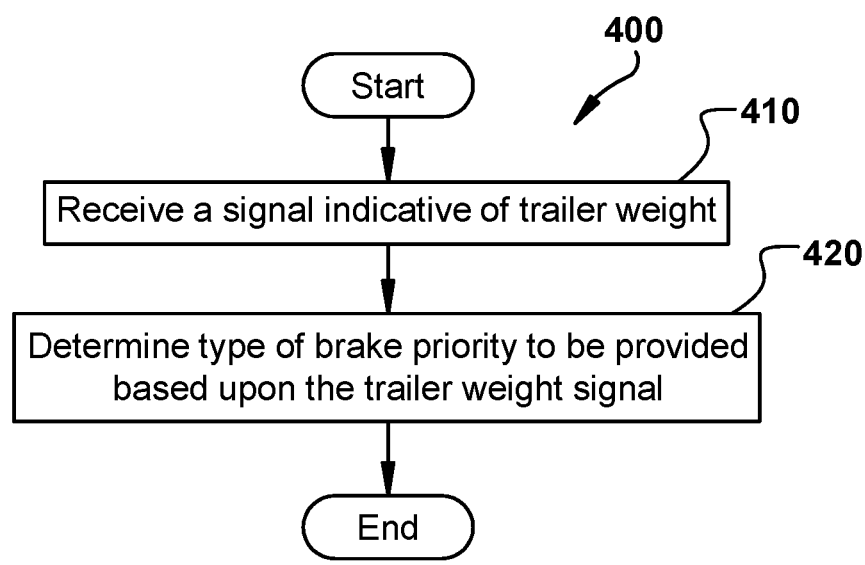
FIG. 4 is a flow diagram depicting an example method of operating the trailer spring brake valve of FIG. 2 in accordance with an embodiment.

Referring to FIG. 4, a flow diagram 400 depicting an example method of operating the trailer spring brake valve 100 of FIG. 2 in accordance with an embodiment is illustrated. The method is for a trailer spring brake valve for a vehicle air braking system. In block 410, a signal indicative of trailer weight is received. Then in block 420, type of brake priority to be provided is determined based upon the trailer weight signal. The process then ends.

In some embodiments, receiving a signal indicative of trailer weight comprises receiving a select one of an electrical signal, a pneumatic signal, and a hydraulic signal indicative of trailer weight.

In some embodiments, receiving a select one of an electrical signal, a pneumatic signal, and a hydraulic signal indicative of trailer weight comprises receiving an electrical signal indicative of trailer weight.

In some embodiments, determining type of brake priority to be provided based upon the trailer weight signal comprises (i) determining type of brake priority to be provided to be service brake priority when the electrical signal received is indicative of trailer weight being above a predetermined weight threshold, and (ii) determining type of brake priority to be provided to be spring brake priority when the electrical signal received is indicative of trailer weight being below the predetermined weight threshold.

A number of advantages are provided by using the above-described trailer spring brake valve 100 of FIG. 2, trailer spring brake valve 100a of FIG. 3, and method 400 of FIG. 4 for a vehicle air braking system. One advantage is that end users have a wide variety of functionalities to select from when designing a trailer air braking system.

Another advantage is that the anti-compounding valve 150 does not require a check valve to perform its anti-compounding function. This avoids cross-communication, which avoids false charging of trailers as well as other potential issues. Yet another advantage is that the use of the holding quick release valve 130 avoids the slow depletion of spring brake chamber pressure.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A trailer spring brake valve for a vehicle air braking system, the trailer spring brake valve comprising:
 a number of components arranged to cooperate together to provide type of brake priority based upon trailer weight,
 wherein the number of components includes an actuatable solenoid for (i) when unactuated, provides one type of brake priority, and (ii) when actuated, provides another type of brake priority.

2. A trailer spring brake valve according to claim 1, wherein (i) service brake priority is provided when the trailer weight is above a predetermined weight threshold, and (ii) spring brake priority is provided when the trailer weight is below the predetermined weight threshold.

3. A trailer spring brake valve according to claim 1 further comprising:
 a pressure protection valve responsive to pressure of an air supply and disposed between the solenoid and the air supply.

4. A trailer spring brake valve according to claim 3, wherein (i) the pressure protection valve prevents air from the air supply to pass through the solenoid when the pressure of the air supply is below a predetermined supply pressure threshold, and (ii) the pressure protection valve allows air from the air supply to pass through the solenoid when the pressure of the air supply is above the predetermined supply pressure threshold.

5. A trailer spring brake valve according to claim 1 further comprising:
 a pressure switch responsive to pressure in a trailer air reservoir and disposed between the solenoid and a signal indicative of trailer weight.

6. A trailer spring brake valve according to claim 5, wherein (i) the solenoid is unresponsive to the trailer weight signal when the pressure switch detects that pressure in the trailer air reservoir is below a predetermined reservoir pressure threshold, and (ii) the solenoid is responsive to the trailer weight signal when the pressure switch detects that pressure in the trailer air reservoir is above the predetermined reservoir pressure threshold.

7. A trailer spring brake valve according to claim 6, wherein (i) service brake priority is provided independent of the trailer weight signal when the pressure switch detects that pressure in the trailer air reservoir is below the predetermined reservoir pressure threshold, and (ii) type of brake priority is provided dependent upon the trailer weight signal when the pressure switch detects that pressure in the trailer air reservoir is above the predetermined reservoir pressure threshold.

8. A trailer spring brake valve according to claim 1 further comprising:
   an anti-compounding valve disposed between the solenoid and a control signal port for receiving a user control signal.

9. A trailer spring brake valve according to claim 1 further comprising:
   a holding quick release valve disposed between the solenoid and an air delivery port for delivering air to spring brake chambers.

10. A trailer spring brake valve for a vehicle air braking system, the trailer spring brake valve comprising:
   means for receiving a signal indicative of trailer weight; and
   means responsive to the trailer weight signal and for determining type of brake priority to be provided based upon the trailer weight signal.

11. A trailer spring brake valve according to claim 10, wherein the means for receiving a signal indicative of trailer weight comprises a signal port through which the trailer weight signal can pass.

12. A trailer spring brake valve according to claim 11, wherein the means responsive to the trailer weight signal comprises an actuatable solenoid for (i) when unactuated, providing service brake priority, and (ii) when actuated, providing spring brake priority.

13. A trailer spring brake valve according to claim 11, wherein (i) service brake priority is provided when the trailer weight signal is indicative of trailer weight above a predetermined weight threshold, and (ii) spring brake priority is provided when the trailer weight signal is indicative of trailer weight below the predetermined weight threshold.

14. A trailer spring brake valve for a vehicle air braking system, the trailer spring brake valve comprising:
   an actuatable solenoid for (i) providing service brake priority when the solenoid is unactuated and trailer weight is above a predetermined weight threshold, and (ii) providing spring brake priority when the solenoid is actuated and the trailer weight is below the predetermined weight threshold;
   a pressure protection valve responsive to pressure of an air supply and disposed between the solenoid and the air supply, wherein (i) the pressure protection valve prevents air from the air supply to pass through the solenoid when the pressure of the air supply is below a predetermined supply pressure threshold, and (ii) the pressure protection valve allows air from the air supply to pass through the solenoid when the pressure of the air supply is above the predetermined supply pressure threshold;
   an anti-compounding valve disposed between the solenoid and a control signal port for receiving a user control signal; and
   a holding quick release valve disposed between the solenoid and an air delivery port for delivering air to spring brake chambers.

15. A trailer spring brake valve according to claim 14 further comprising:
   a pressure switch responsive to pressure in a trailer air reservoir and disposed between the solenoid and a signal indicative of trailer weight, wherein (i) service brake priority is provided independent of the trailer weight signal and the solenoid is unresponsive to the trailer weight signal when the pressure switch detects that pressure in the trailer air reservoir is below a predetermined reservoir pressure threshold, and (ii) type of brake priority is provided dependent upon the trailer weight signal and the solenoid is responsive to the trailer weight signal when the pressure switch detects that pressure in the trailer air reservoir is above the predetermined reservoir pressure threshold.

16. A method of operating a trailer spring brake valve for a vehicle air braking system, the method comprising:
   receiving a signal indicative of trailer weight; and
   determining type of brake priority to be provided based upon the trailer weight signal.

17. A method according to claim 16, wherein receiving a signal indicative of trailer weight comprises receiving a select one of an electrical signal, a pneumatic signal, and a hydraulic signal indicative of trailer weight.

18. A method according to claim 17, wherein receiving a select one of an electrical signal, a pneumatic signal, and a hydraulic signal indicative of trailer weight comprises receiving an electrical signal indicative of trailer weight.

19. A method according to claim 18, wherein determining type of brake priority to be provided based upon the trailer weight signal comprises (i) determining type of brake priority to be provided to be service brake priority when the electrical signal received is indicative of trailer weight being above a predetermined weight threshold, and (ii) determining type of brake priority to be provided to be spring brake priority when the electrical signal received is indicative of trailer weight being below the predetermined weight threshold.

* * * * *